(12) United States Patent
Pascarella et al.

(10) Patent No.: US 8,082,322 B1
(45) Date of Patent: Dec. 20, 2011

(54) FEDERATION OF INFORMATION FROM MULTIPLE DATA SOURCES INTO A COMMON, ROLE-BASED DISTRIBUTION MODEL

(75) Inventors: Louis Pascarella, Minnetrista, MN (US); Brian Kondalski, Minnetonka, MN (US); Stephen Rickus, Excelsior, MN (US)

(73) Assignee: Parametric Technology Corporation, Needham, MA (US)

( * ) Notice: Subject to any disclaimer, the term of this patent is extended or adjusted under 35 U.S.C. 154(b) by 2228 days.

(21) Appl. No.: 10/621,043

(22) Filed: Jul. 15, 2003

Related U.S. Application Data

(63) Continuation of application No. 09/427,228, filed on Oct. 26, 1999, now abandoned.

(60) Provisional application No. 60/105,810, filed on Oct. 27, 1998.

(51) Int. Cl.
*G06F 15/16* (2006.01)
*G06F 17/00* (2006.01)

(52) U.S. Cl. ........ 709/218; 709/217; 709/219; 707/759; 707/760

(58) Field of Classification Search .......... 709/217–219, 709/223–226, 246; 707/758–760
See application file for complete search history.

(56) References Cited

U.S. PATENT DOCUMENTS

| | | | | |
|---|---|---|---|---|
| 5,754,830 A | * | 5/1998 | Butts et al. | 719/311 |
| 5,835,712 A | * | 11/1998 | DuFresne | 709/203 |
| 6,058,373 A | * | 5/2000 | Blinn et al. | 705/26.81 |
| 6,144,990 A | | 11/2000 | Brandt et al. | |
| 6,189,045 B1 | | 2/2001 | O'Shea et al. | |
| 6,192,415 B1 | * | 2/2001 | Haverstock et al. | 709/245 |
| 6,205,480 B1 | * | 3/2001 | Broadhurst et al. | 709/225 |
| 6,208,986 B1 | | 3/2001 | Schneck et al. | |
| 6,229,534 B1 | | 5/2001 | Gerra et al. | |
| 6,295,531 B1 | | 9/2001 | Bae et al. | |
| 6,314,429 B1 | | 11/2001 | Simser | |
| 6,338,096 B1 | | 1/2002 | Ukelson | |
| 6,356,931 B2 | | 3/2002 | Ismael et al. | |
| 2002/0049833 A1 | * | 4/2002 | Kikinis | 709/219 |

* cited by examiner

*Primary Examiner* — Brendan Higa
(74) *Attorney, Agent, or Firm* — Schwegman, Lundberg & Woessner, P.A.

(57) ABSTRACT

A computerized system for and method of creating applications that access information from multiple data sources into a common, role-based distribution model are described. The computerized system includes a server having one or more dynamic object libraries, one or more template libraries, and a dynamically allocated area in the computer memory where data is stored, referenced, and manipulated. The system also includes one or more adapters, each allowing the server to access one of the data sources.

7 Claims, 7 Drawing Sheets

```
120 ─── <HTML>
122 ─── <HEAD>
124 ─── <TITLE>Employees</TITLE> ─── 125
126 ─── </HEAD>
128 ─── <BODY>

142 ─── WEBJECT NAME=Query-Objects        TYPE=obj>
140 ───    <PARAM KEY=DBHOST              VALUE=localhost>
           <PARAM KEY=DBPORT              VALUE=oralink>
           <PARAM KEY=CLASS               VALUE=EMP1>
           <PARAM KEY=WHERE               VALUE=*()*>
           <PARAM KEY=ATTRIBUTES          VALUE=*EMPNO,ENAME,SAL*  delim=*,*>
           <PARAM KEY=GROUP_OUT           VALUE=*query_results*>
        </WEBJECT>

152 ─── <WEBJECT NAME=*Object-List*       TYPE=*DSP*>
150 ───    <PARAM KEY=*GROUP_IN*          VALUE=*query_results*>
           <PARAM KEY=*ATTRIBUTES*        VALUE=*EMPNO,ENAME,SAL*  DELIM=*,*>
        </WEBJECT>

130 ─── </BODY>
132 ─── </HTML>
```

This is where the webjects start. A webject is processed by the Info*Engine server and the resulting information is sent back to the template.

```
120 ─<HTML>
122 ─<HEAD>
124 ─<TITLE>Employees</TITLE> ─125
126 ─</HEAD>
128 ─<BODY>
```

This is where the webjects start. A webject is processed by the Info*Engine server and the resulting information is sent back to the template.

```
142 ┌<WEBJECT NAME=Query-Objects        TYPE=obj>
140 │   <PARAM KEY=DBHOST               VALUE=localhost>
    │   <PARAM KEY=DBPORT               VALUE=oralink>
    │   <PARAM KEY=CLASS                VALUE=EMP1>
    │   <PARAM KEY=WHERE                VALUE=*()*>
    │   <PARAM KEY=ATTRIBUTES           VALUE=*EMPNO,ENAME,SAL*   delim=*,*>
    │   <PARAM KEY=GROUP_OUT            VALUE=*query_results*>
    └</WEBJECT>

152 ┌<WEBJECT NAME=*Object-List*        TYPE=*DSP*>
150 │   <PARAM KEY=*GROUP_IN*           VALUE=*query_results*>
    │   <PARAM KEY=*ATTRIBUTES*         VALUE=*EMPNO,ENAME,SAL*   DELIM=*,*>
    └</WEBJECT>

130 ─</BODY>
132 ─</HTML>
```

FIG. 2A

```
120 ─── <HTML>
122 ─── <HEAD>
124 ─── <TITLE>Employees</TITLE>
126 ─── </HEAD>
128 ─── <BODY>
```
This is the start of the HTML output that Info*Engine sends to the web browser to replace the webject.

```
       <PRE>
       <B>empno      ename      sal</B>
160 ──
       7876        ADAMS      1100
       7499        ALLEN      50000
       7698        BLAKE      2850
       7782        CLARK      2450
       7900        JAMES      950
       7654        MARTIN     50000
       7934        MILLER     1300
       7844        TURNER     50000
       783         dave </PRE>
       <B>9 Objects found. </B>

130 ─── </BODY>
132 ─── </HTML>
```

FIG. 2B

| empno | ename | sal |
|-------|-------|-----|
| 7876 | ADAMS | 1100 |
| 7499 | ALLEN | 50000 |
| 7698 | BLAKE | 2850 |
| 7782 | CLARK | 2450 |
| 7900 | JAMES | 950 |
| 7654 | MARTIN | 50000 |
| 7934 | MILLER | 1300 |
| 7844 | TURNER | 50000 |
| 783 | dave | |

9 objects found

FEDERATION OF INFORMATION FROM MULTIPLE DATA SOURCES INTO A COMMON, ROLE-BASED DISTRIBUTION MODEL

RELATED APPLICATIONS

This application is a continuation under 37 C.F.R. 1.53(b) of U.S. application Ser. No. 09/427,228 filed Oct. 26, 1999 now abandoned, which claims priority under 35 U.S.C. 119 (e) from U.S. Provisional Application Ser. No. 60/105,810, filed Oct. 27, 1998, which applications are incorporated herein by reference.

FIELD OF THE INVENTION

The present invention relates generally to a computerized system for and method of creating applications that access information from multiple data sources, and more specifically to the federation of information from multiple data sources, into a common role-based distribution model.

BACKGROUND OF THE INVENTION

Companies are continually trying to enhance revenue and profitability by improving the overall "Time-To-Market" of products or services. One critical component in improving Time-To-Market is through the empowerment of knowledge workers who participate in well-defined processes. The combination of people and processes are key to developing a successful business model, and the empowerment of knowledge workers is enhanced by providing access to the correct information at the right time within a process.

It is critical to leverage existing information systems when providing knowledge workers access to information. The cost of replacing these systems to facilitate a streamlined process is prohibitive. And the cost of modifying systems to accommodate changes related to continuous process improvements only accentuates the point. These information systems must be used with as little intrusion on the ability to upgrade, replace and utilize the application in its current state as possible.

Over the past 40 years companies have purchased and installed extremely robust information systems in an attempt to offer their knowledge workers the ability to work smarter within business processes. These systems include Manufacturing or Enterprise Resource Planning (MRP/ERP) systems, Product Data Management (PDM) systems, Relational Database Management Systems (RDBMS), and Computer Aided Design, Engineering and Manufacturing (CAD/CAE/CAM) systems. They usually address the primary task or role on an individual worker. As a result they are deployed on a tactical or departmental basis, and only facilitate knowledge workers of a specific genre who are creating information with applications. Even though others in the enterprise can benefit from the information available in these systems, they do not have access to it because the systems are often complex and difficult to learn how to use, and expensive to deploy beyond a single department.

Even when the data from these systems is available to knowledge workers throughout the enterprise, the assembly of useful information from multiple systems is difficult. Users are required to access different systems, often repeating the entry of the similar data into each one, and assemble the information manually, if it is found at all. As a result, the task is too often performed with a phone call to individual users of the multiple systems, which results in delays waiting for return phone calls and a high probability of incorrect information. As a result, the systems that have been installed to facilitate knowledge workers have done so only for individual tasks and have not improved the worker's access to timely information from an overall process point of view.

Another issue involved in making information available to knowledge workers on an enterprise wide basis is the administration of the systems. User names and passwords have to be maintained in every system for each individual who has access to the systems. That puts a burden upon the user also, in that they have to remember multiple user names and passwords that are often different on different systems. In addition, access to information in different systems based upon a user's role must be controlled to preserve the integrity of the data.

One approach taken to overcome this problem is to integrate the data available in applications to form a homogeneous data environment. That way relevant corporate information is available to users of any of the systems involved in the integrated system. The integration is accomplished by copying relevant information from the system it originated in to each of the others. The user interface of each system is modified to make the data available to the user of each system.

There are many problems inherent with the development of an integrated system. The difficulty and the cost of the initial development and maintenance of integrating systems increases exponentially as the number of systems increases since each system usually has its own proprietary application programming interface and data model. Maintaining the integrity of the data throughout the integrated environment is difficult and costly since the data is usually copied from one system to another. Each system user interface requires modification to provide access to new data. And this approach makes future changes to any single system extremely difficult as it affects many other systems.

The advent of the World Wide Web has brought forth several new technologies that have been used in an attempt the resolve the business problem defined above. For instance, Web technologies such as Netscape Navigator, Microsoft's Internet Explorer and NCSA's Mosaic allow a user to take a Web browser from a box, install it, and access pre-authored web pages from around the world. Recently, many organizations have adopted the use of web technologies for use within the enterprise. These internal networks are referred to as "intranets."

Intranets commonly support electronic mail and access to static data such as company policies and financial reports, as well as access to data that exists on the external Internet. The use of certain web technologies has supported this growth and has recently begun to further the use of these intranets to include active-content pages, or delivery of data contained within enterprise systems to the user desktops. The method most companies are using to provide active-content pages for client users include four web technologies: HTTPD, web browsers, HTML and CGI.

The Hyper Text Transfer Protocol Daemon (HTTPD) is a web server process which runs on many industry-standard operating systems, and supports many industry-standard network protocols. The web server listens on a common network port for requests for data from a web client. When the requests are received, the web server locates an appropriate file stored locally on the server and then passes that file across the network to the web client for translation.

Web "browsers" are commercial off-the-shelf (COTS) applications that run locally on the client. Through the browser, clients make file requests of the web server, receive the file from the server through the network and then translate the file data into a presentation format for the user. One such browser in use today is the Netscape Navigator web browser.

The Hyper Text Markup Language (HTML) is a series of tags stored in a text file. These tags define how a web browser should display information to a user viewing an HTML file. Typically, the information consists of static text surrounded by HTML tags. HTML also offers the ability to insert images onto the page. Another, aspect of HTML is the ability to provide tags that point to another page. These tags, referred to as links, allow users to navigate through the World Wide Web, to a network of HTML pages. For example, a tag displays the words "Click here" to the user:

<A HREF="http://www.mycompany.com/index.html"> Click here</A>

Upon clicking on the text, the client browser would request that the index.html file be sent from the server (defined as "www.mycompany.com") to the client for local translation and display. The location (http://www.mycompany.com/index.html) points to this specific file on a specific server. This file or page location is referred to as an address or Universal Resource Location (URL).

Companies have recently started building active-content (or non-static) pages for display by their web clients. The Common Gateway Interface (CGI) is a standard that allows external programs to be written to perform a task (such as a query against a database) and then translate the results into HTML text. This type of solution utilizes a four-tier architecture including that of the client.

CGI programs reside on a web server. CGI programs are written utilizing a programming language such as 'C' or Perl. A web client launches the CGI program by a user selecting a URL or address for the CGI program (which appears to be the URL for another HTML page to the user). Upon receiving this request, the web server launches the CGI program that corresponds to the URL and then waits for the CGI program to return a data stream. This data stream sometimes contains information from a database or other system within the enterprise. Upon receiving the resulting HTML text from the CGI program, the server then passes the text to a web browser running on the web client. To the user, the text appears on the screen as usual (selected by a URL that supplied an HTML page). Most companies have adopted the use of the CGI architecture for their active-content intranet solutions.

Although the CGI approach has given organizations access to system data that addresses the issue of providing knowledge workers with information, there are several scalability constraints with the architecture. A CGI program is usually only written to provide specific actions against a specific system's data. A CGI program is also written to produce a single HTML screen as its result. Application developers must write programming code with intimate knowledge of an application's programming interface or access language (such as Structured Query Language). Each time a developer wishes to change a screen, the CGI program must be modified and recompiled. Additionally, each time the developer wishes to change the action(s) against the data, the CGI program must be modified and recompiled. Writing CGI programs requires in-depth knowledge of a programming language such as C or Perl in addition to knowledge of the system's Application Programming Interface (API). This is inherently frustrating to intranet developers since a basic premise behind the HTML language is ease of development and flexibility. CGI also presents potential security problems when uncompiled source code must reside at a customer site or in publicly accessible directories in the case of Perl-based applications.

Attempting to provide interoperability, or access to data from more than one system, in this CGI-based approach, further extends the problems of scalability. It requires the interfacing to multiple APIs and data models, increases administrative maintenance in each system in order to provide secure access to data, and makes it difficult to implement system upgrades.

The basic intranet technologies provide a mechanism for the distribution of information to an enterprise and beyond. These technologies have proven to be easy to use so they are ideal for providing a common user interface to enterprise information. However these technologies need to be extended. There is a need for a web-based intranet technology that:

- Provides access to current information systems in a non-intrusive way.
- Provides a common mechanism to access data (using an application API, database access or application user interface) at the HTML development level.
- Provides easy access to and manipulation of data contained in multiple information systems in one HTML page.
- Controlled access to information based upon a user's role, while controlling the administrative costs of managing large numbers of users accessing multiple information system.
- Does not require significant maintenance costs to incorporate updates to individual information systems.
- Does not require programming code to be modified and compiled each time the functionality or format of a display must be changed.
- Does not require programming code to be modified and compiled to change data access.
- Does not require any additional programs or other installation requirements at the client beyond a Web browser.

SUMMARY OF THE INVENTION

The above-identified shortcomings as well as other shortcomings are addressed by the present invention, which will be understood by reading and studying the following specification. A computerized system for and method of creating applications that access information from multiple data sources into a common, role-based distribution model are described. The computerized system includes a server having one or more dynamic object libraries, one or more template libraries, and a dynamically allocated area in the computer memory where data is stored, referenced, and manipulated. The system also includes one or more adapters, each allowing the server to access one of the data sources.

The dynamic object libraries are the core processing elements of the invention. We will refer to the dynamic object libraries as the server in the following discussions. They are programmed to interpret parameterized requests to perform services from various sources.

In one embodiment of the server, it is programmed to interface with a Web server where it interprets HTML pages contained in the template libraries as users request them using a Web browser. The HTML pages contain custom HTML tags called webjects that define the parameterized requests and direct the server to perform specific actions as described in the different embodiments of the invention. One of the functions defined by the webjects is to direct the server to access data from or send data to an adapter. When data is retrieved from the adapter, the server program dynamically allocates memory to hold the data in a common format, independent of the source of the data, and manipulate the data as described later.

The dynamically allocated memory in the server is called a virtual database or VDB. One use of the VDB is to provide the mechanism for providing a scalable system for role-based distribution of data. The content of the VDB is used to define the location and access to adapters that can be running on different computers, to provide user authentication for controlled access to data available through adapters, and to provide a mechanism for defining role-based access to the data. The server is programmed to implement these functions as it interprets the HTML templates and accesses other information from the Web server.

In another embodiment, the server is interfaced to object oriented communication libraries so it can respond to non-user driven requests form other programs. In this embodiment, the webjects are replaced by other formats for the requests for services, such as those defined by the CORBA standard.

The adapters provide access to different data sources such as databases and applications through application programming interfaces. One of the adapters allows the server to access a directory service. Another one of the adapters allows the server to access legacy information sources.

In different embodiments of the invention, computers, computerized systems, application programs, and computer-readable media of varying scope are described. Still other and further embodiments, aspects and advantages of the invention will become apparent by reference to the drawings and by reading the following detailed description.

BRIEF DESCRIPTION OF THE DRAWINGS

FIG. 2A is an example of an HTML template comprising both HTML tags and webjects.

FIG. 2B is an example of the HTML template of FIG. 2A after a webject has been processed.

FIG. 2C is an example of the HTML template of FIG. 2B translated and displayed by a web browser.

DESCRIPTION OF THE EMBODIMENTS

Figure 1:
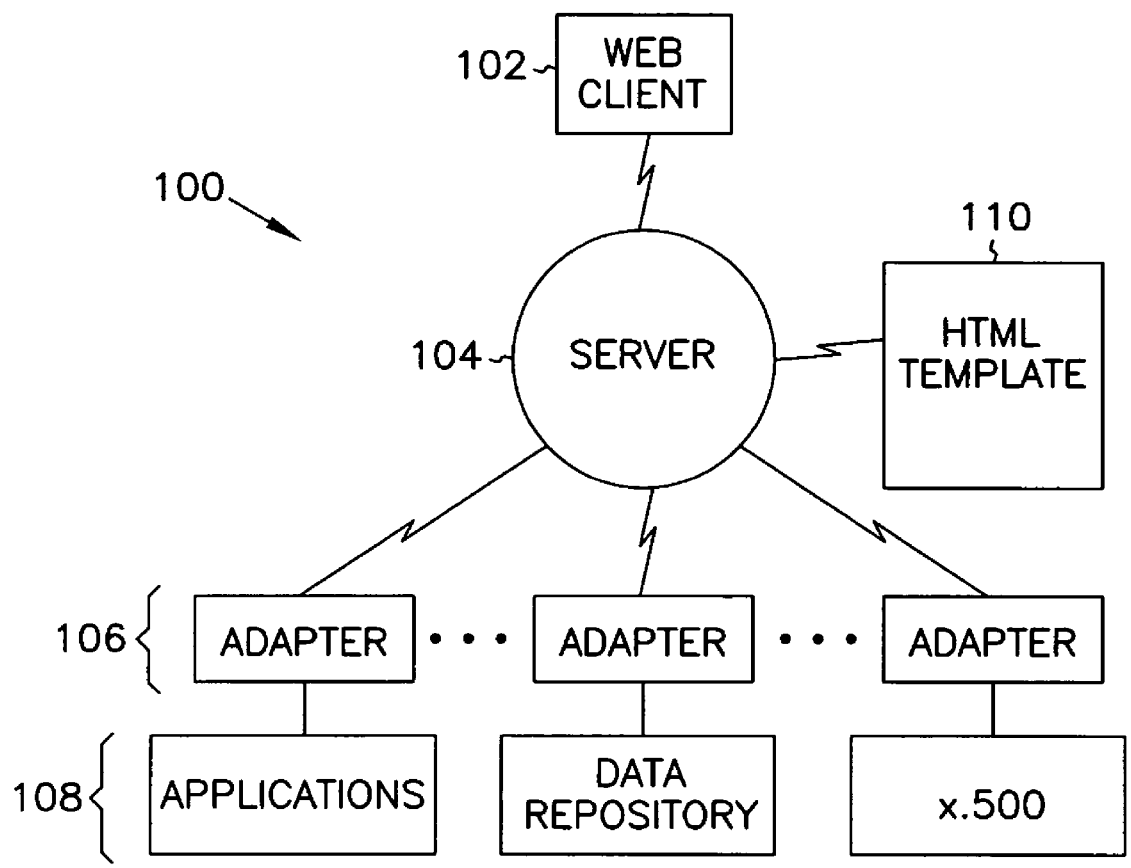
FIG. 1 is a diagram of an intranet architecture of the present invention

In the following detailed description of the embodiments, reference is made to the accompanying drawings that form a part hereof, and in which is shown by way of illustrating specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is therefore, not to be taken in a limiting sense, and the scope of the present inventions is defined only by the appended claims.

The detailed description is divided into six sections. The first section provides an overview of one embodiment of an intranet architecture for federated information from multiple data sources into a common, role-based distribution model. The second section describes the specifications of three important functions of the invention. The third section illustrates the components of the server for an intranet embodiment of the invention. The fourth section illustrates the data flow for an example embodiment of the invention. The fifth section describes a particular implementation of the invention found in the Info*Engine product. The sixth section is a conclusion that includes a summary of the advantages of the present invention.

Overview. This section provides an overview of an embodiment of an intranet architecture for the federation of information from multiple data sources into a common, role-based distribution model. Those skilled in the art will recognize, however, that an internet architecture may be utilized without diverting from the spirit and scope of the present invention.

The present invention provides a software architecture for creating web-based applications that access information from multiple data sources and distribute it using a role-based distribution model across an extended enterprise. As referred to herein, an extended enterprise is a company in conjunction with its customers and suppliers who must share common information. An example of such an extended enterprise is an automotive electronics manufacturer, the circuit board supplier to the manufacturer, and the ultimate customer, the automobile manufacturer. All three companies must share design and manufacturing data among users within all three companies. Together, on a particular project, the three companies often function as a single logical entity.

The software tool of the present invention that is used in an intranet environment utilizes webjects. Webjects are parameterized object instructions that are inserted in a text file (ASCII) to specify the manner of dynamically organizing, manipulating and formatting information that appears on a web page. Using webjects to dynamically access information, as well as to generate content for a web page from a plurality of information sources provides the capability to easily access data across heterogeneous computing environments. An advantage of using webjects over existing means for data access is that webjects do not have to be rewritten and compiled to change the desired action or output.

In this embodiment, a webject is a parameterized command inserted in a file (or HTML template) specifying a manner of dynamically organizing, manipulating and formatting information, which then commonly appears on a web page. Webjects, used in this embodiment are similar to standard HTML tags and are inserted into HTML files the same way HTML tags are inserted. No complicated programming knowledge is necessary for one of skill in the art to insert webjects into HTML files. However, webjects are processed differently than HTML tags are processed by the web server. HTML tags define how the web browser displays static information. In contrast, webjects define a plurality of specific functions to be executed by the server. The specific functions have the capability to dynamically find, create, change, organize, manipulate and format information that appears on a web page. The specific function executed depends on the type of webject encountered by the web server. In one embodiment of the present invention, the webjects are grouped into four types: action, display, group and query. The specific functions associated with each type of webject are further described in the discussion of FIG. 5 in section 4.

FIG. 1 is a diagram of one embodiment of an intranet architecture (100) of the present invention. The intranet architecture (100) includes the following components: one or more clients 102, a server 104, one or more adapters 106, a plurality of information sources 108 and a plurality of HTML templates 110.

Each one of the clients 102 is a web client running one of any commonly available software applications used to locate and display web pages. In one embodiment, the software application running on the web client is a web browser displaying graphics and text. In another embodiment, the software application is a web browser also displaying multimedia information including sound and video.

The server 104 is a web server that responds to requests for data from a web client 102. When the server 104 receives a request for data from the web client 102, the server processes the request and returns an HTML template 110 for translation and display by the web browser running on the web client 102. If the request from the client is for an HTML template having one or more webjects, the server first executes a specific function based on the type of webject. The server then generates a new HTML template to return to the client in response to the request. The new HTML template 110 returned by the server 104 is a text (ASCII) file comprising a plurality of standard HTML tags and a plurality of text representing the output of the specific function executed. The plurality of text replaces the webject commands in the original HTML template. Examples of such HTML templates are shown in FIGS. 2A-2C below.

In one embodiment the computer hardware for the server is a Hewlett-Packard 700 series or higher workstation running a HPUX 9.x/10.x operating system. In an alternate embodiment the server is a SUN SPARC workstation running a Solaris 2.4/2.5 operating system. In another embodiment the server is a Silicon Graphics Inc. workstation running an IRIX 5.2/5.3 operating system. Those skilled in the art will recognize, however, that other comparable hardware and operating systems may be employed without diverting from the spirit and scope of the present invention The server 104 communicates with one or more of the adapters 106 to process an action webject or a query webject. Each one of the adapters 106 comprises the ability to convert an Info*Engine request into the appropriate format to cause a function or transaction to occur within the system with which it is designed to interface.

The server 104 and the adapters 106 can be located on the same computer or can be dispersed across a network. The adapters 106 provide the capability to access and manipulate one or more of the information sources 108. The information sources 108 include, but are not limited to, applications, data repositories, Lightweight Directory Access Protocol (LDAP) directories and X.500 directories. Data repositories include, but are not limited to, database information sources such as object-oriented databases, relational databases and legacy databases. Other data repositories include Metaphase Product Data Management system from SDRC, BaanPDM from BaanEngineering, 3270 based Legacy Systems, SAP and others. Alternate embodiments having additional or differing combinations of information sources will be readily apparent to one skilled in the art and are contemplated as within the scope of the invention.

FIGS. 2A, 2B and 2C are an HTML template with webjects, an HTML template after the webjects are processed by the server, and the HTML output displayed by the web browser respectively. A first HTML template contains a plurality of HTML tags and one or more webjects as show in FIG. 2A. When the server processes the first HTML template containing a webject, the server executes a specific function on data available from at least one of the plurality of information sources to produce an output. The server dynamically generates a second HTML template by replacing the webject in the first HTML template with the output from the specific function executed as shown in FIG. 2B. The second HTML template is displayed to the user through a common user interface running on the client as shown in FIG. 2C. Using webjects to dynamically generate content for HTML documents from a plurality of information sources provides the capability to easily access data across heterogeneous computing environments. An advantage of using webjects over existing means for data access is that an HTML template author does not have to rewrite and compile programming code to change the desired output; rather, the template author only needs to edit the first HTML template to change the result.

FIG. 2A is an example of an HTML template comprising both HTML tags and webjects. FIG. 2A shows a plurality of standard HTML tags 120-132, a first webject 140 and a second webject 150. The plurality of standard HTML tags 120-132 denote the various elements in the HTML template. Each one of the HTML tags comprises a left angle bracket (<), a tag name and a right angle bracket (>). The HTML tags usually operate in pairs (e.g., <H1> and </H1>) indicating a start and an end of an instruction. An end tag appears the same as a start tag except a slash (/) precedes the text within the brackets. Every HTML document contains certain standard HTML tags such as <HTML>, <HEAD>, <TITLE>, and <BODY> start tags and the corresponding end tags. Each HTML document consists of head and body text. The head contains the title, and the body contains the actual text that is made up of paragraphs, lists and other elements.

In the HTML template of FIG. 2A, a <HTML> tag 120 indicates to the web browser that the file contains HTML-coded information. A <HEAD> tag 122 identifies a first part of the HTML template that contains a title. The title is shown as part of the web browser's window. A <TITLE> tag 124 contains the document title and identifies the document contents in a global context. The title is typically displayed in the title bar at the top of the browser window and may also be displayed in a bookmark list, but the title is not typically displayed inside the window itself. In the example HTML template in FIG. 2A, the title is "Employees." A </TITLE> tag 125 identifies the end of the document title. A </HEAD> tag 126 identifies the end of the first part of the HTML template containing the title. A <BODY> tag 128 identifies a second part of the HTML template that contains the content of the document to be displayed within the text area of the web browser window. A </BODY> tag 130 identifies the end of the second part of the HTML template. A </HTML> tag 132 identifies the end of the HTML template. Alternate embodiments having additional HTML tags or differing combinations of HTML tags will be readily apparent to one of skill in the art and are contemplated as within the scope of the invention.

Each one of the webjects 140, 150 in the body of the HTML template in FIG. 2A is comprised of a start tag, a plurality of parameters and end tag. A first line 142, 152 of each one of the webjects 140, 150 begins with the start tag introducing the webject. In one embodiment of a webject, the start tag is represented by the text "<WEBJECT" and is located at the beginning of the first line of the webject. The text "<WEBJECT" identifies the beginning a webject in the HTML template.

Immediately following the start tag is a name parameter and a type parameter identifying the webject. The first line 142, 152 ends with a greater than symbol (>) indicating the conclusion of the first line. The name parameter immediately follows the start tag of the webject. The name parameter identifies a specific webject in the template. In an example embodiment, the name parameter uses the following syntax: NAME="webject name". The name parameter in the first webject 140 has the value of "Query-Objects." The name parameter in the second webject 150 has the value of "Object-List."

The type parameter immediately follows the name of the webject. The type parameter identifies the kind of webject in the template. The type parameter uses the following syntax: TYPE="Type". In an example embodiment, the type parameter is one of the following four values: ACT, DSP, GRP or OBJ. Each one of the type values corresponds to one of the four types of webjects in the example embodiment. The type ACT corresponds to an action webject. The type DSP corresponds to a display webject. The type GRP corresponds to a group webject. The type OBJ corresponds to a query webject. In the first webject 140 the type parameter has the value of "OBJ" which corresponds to the query webject. In the second webject 150 the type parameter has the value of "DSP" which corresponds to the display webject.

A plurality of parameters with attributes immediately follow the first line 142, 152 of each one of the webjects 140, 150. In one embodiment each one of the parameters and its associated attributes is displayed on a separate line. The parameters specify the criteria for data access, manipulation and display via the server. In one embodiment, a parameter has three main parts: the PARAM tag, the KEY attribute and other parameter information. The PARAM tag does not require an end tag (i.e. </PARAM>). In the example embodiment in FIG. 2A, each PARAM tag appears on a separate line between the <WEBJECT> and </WEBJECT> tags of the webject. The KEY attribute specifies the name of a parameter to which a value must be assigned. The information following the name of the parameter depends on the parameter being specified within a webject. This information includes anything from a specific value to a URL to input submitted by a user.

FIG. 2B is an example of the HTML template of FIG. 2A after each one of the webjects 140, 150 are processed by the server. The HTML template of FIG. 2B comprises the plurality of standard HTML tags 120-132 as shown in FIG. 2A and one or more additional HTML tags combined with a plurality of text representing the output 160 of the specific function executed. In FIG. 2B the output of the specific function executed replaces each one of the webjects 140, 150 present in FIG. 2A. The additional HTML tags indicate how the text representing the output is to be formatted.

FIG. 2C is an example of the HTML of FIG. 2B displayed by the web browser on the client. A plurality of text 170 displayed in the window of the web browser corresponds to the text representing the output 160 of the function executed as shown in FIG. 2B.

Figure 3:
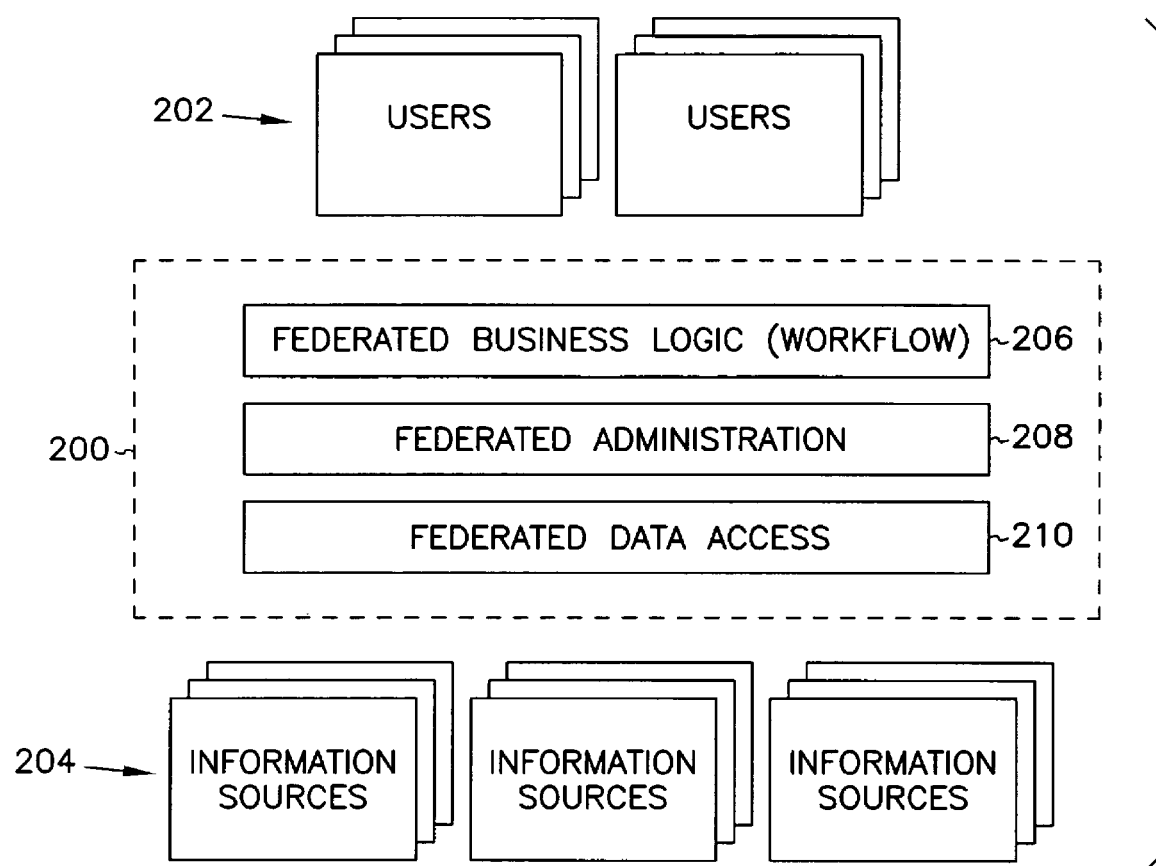
FIG. 3 is a functional diagram of the intranet architecture of FIG. 1.

Functional Specifications. This section describes the specifications for three of the important functions of the invention. These are the three most important functions required of a system that provides federated information from multiple sources in a common, role-based distribution model that can be scaled so it can deployed to an extended enterprise. FIG. 3 is a functional diagram of one embodiment of the intranet architecture of FIG. 1. The server and the adapters as shown in FIG. 1 together comprise a web-enabled software tool 200 for the distribution and exchange of information between users 202 and information sources 204 across an extended enterprise. The web-enabled software tool 200 provides three major functions to users within the extended enterprise: federated business logic or workflow 206, federated administration 208 and federated data access 210.

Workflow refers to a defined series of tasks within an organization to produce a final outcome. Federated business logic or workflow 206 provides the capability to define the workflow process at the user level thereby providing ease-of-use functionality across multiple information sources. For example, a drawing release process within a design engineering department involves multiple tasks that are performed by different users. Each task may require that a user perform multiple activities. Some activities may be managed within a workflow engine, while others require information to be referenced and changed within other system(s). The invention described here can provide access to the information contained in a workflow engine and present that information to a user. For example, a list of tasks can be requested from the adapter that accesses the information in the workflow engine using a webject. Another webject is used to display the information to the user on a Web browser. As will be shown later, access to the workflow engine can be controlled such that the information retrieved is that defined for the individual performing the task, or is based upon the role the individual plays within the business process. The task identifiers on the browser screen can be linked to a series of templates that use webject to retrieve additional information about the task from one or more systems, display the information to the user for evaluation and disposition. The final task may request information from the user that is inserted into one or more data repositories using action webjects.

Federated administration 208 provides global user access across enterprise-wide information sources thereby eliminating the need for a user to have different logins for multiple systems and multiple databases. The invention described here can be configured to query a user profile database or directory (which can be a central repository for administrative information) for system administration information using webjects. Information such as which applications a user may access, access methods allowed, and user names and passwords can be retrieved. This information can be defined for an individual user or it can be based upon the role of the user in a particular situation. Because this information is retrieved using parameter driven webjects, the system can be configured to access the information from multiple sources and configurations for different installations. Once the server retrieves this administrative information, it is used by other object and action webjects using specific parameters to control the access to data repositories. Another component of administrative data that can be used is a central application profile that contains information about the where adapters are running in the computer network and how to communicate with them. These administrative functions are important aspects of a system that is scalable and they reduce the maintenance costs of the system.

Federated data access 210 eliminates the need for a user to go to separate, autonomous databases by federating the data from the databases and making the data available as a single source to the user. For example, a design engineer may need to view drawing information that is contained in a file managed by a document management system. This file may be contained in the document management system's vault. The user must view a list of files contained within the vault, then select the drawing of interest to view it. However, there may be more than one document management system that manages files (one at this user's location, and another at a supplier location). Normally, this user wouldn't have access to both systems simultaneously. However, using the invention described here, the user can be presented a vault file list that contains information that was queried from both document management systems and combined into a single list.

Another example of federated data access is that of a screen presented to the user which contains a part number from the parts management system, an image of the part from the data file management system, and the supplier of the part address from the purchasing system. Group webjects are use to combine information from multiple sources that is stored in the VDB. The function of the action webjects is described later.

The web-enabled software tool 200 utilizes industry standards such as X.500, X.509, X.520, X.521, X.400, Internet Message Access Protocol (IMAP), Open Database Connectivity (ODBC), Java Database Connectivity (JDBC), Lightweight Directory Access Protocol (LDAP), Common Object Request Broker Architecture (COBRA), Structured Query Language (SQL), Java, Hyper Text Transfer Protocol (HTTP) and HTML.

Figure 4:
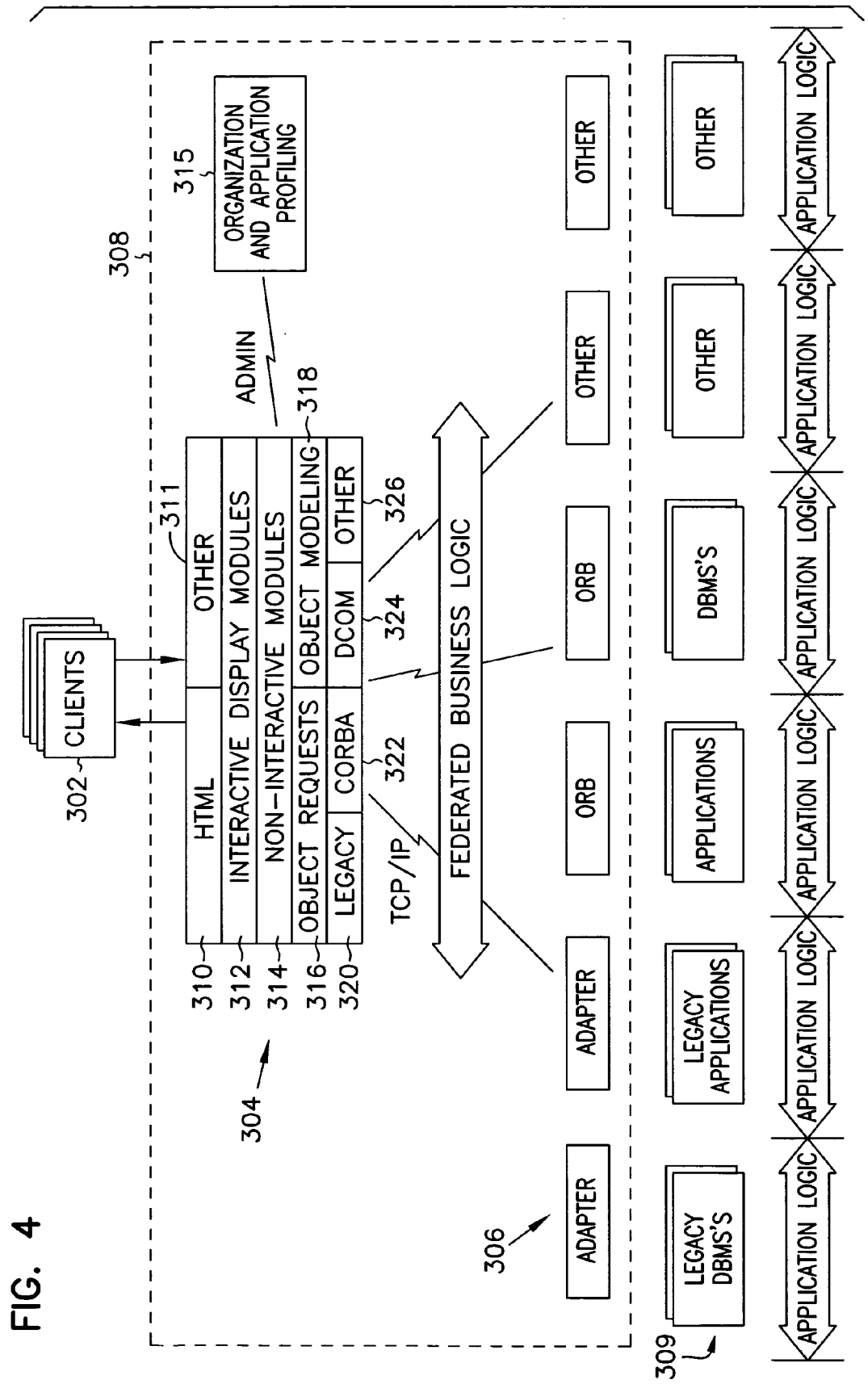
FIG. 4 is a block diagram of the intranet architecture of FIG. 1.

Server Components. FIG. 4 is a block diagram of the intranet architecture of FIG. 1. It is used to illustrate the server components of an example embodiment of the invention in an intranet architecture. Each one of the clients 302 is a web client running a web software agent such as a web browser. A server 304 and one or more of adapters 306 together comprise a web-enabled software tool 308 for the distribution and exchange of information between the clients 302 and the information sources 309 across an extended enterprise.

The server 304 comprises an HTML component 310, an object request component 316, an object modeling component 318, a legacy component 320, and a Common Object Request Broker Architecture (CORBA) component. The HTML component generates HTML to be displayed on a web browser. The object request component determines which applications (adapters) should be accessed, which classes of objects to access, what attributes of the objects to manipulate or query, and how to access them. This information is contained in the parameters that define the webjects. The object modeling component allows information that is returned from one or more applications to be joined, sorted, or manipulated prior to displaying it. The legacy component is an adapter or adapters that offer access to mainframe systems. The CORBA component is an adapter that contains the ability to communicate with a CORBA-based object request broker.

Each one of the adapters 306 communicates with the server 304 to access and manipulate one or more of the of information sources 309. The information sources 309 include, but are not limited to legacy and non-legacy database management systems (DBMSs) as well as legacy and non-legacy applications. Additional or differing combinations of information sources are contemplated and within the scope of the invention. Each one of the adapters is a separate component or software module that comprises the ability to convert a request from the server into the appropriate format to cause a function or transaction to occur within the system with which it is designed to interface.

In one embodiment, the server 304 processes templates formatted in HTML. As will be readily apparent to one skilled in the art, the invention is not limited to HTML. The use of any language that supports links to other documents, as well as graphics, audio and video files, is contemplated and within the scope of this invention.

Both interactive display modules 312 and non-interactive display modules 314 deliver the functionality of the server 304. The interactive display modules 312 allow a user to initiate a data access request using an HTML template having one or more webjects. As the server 304 processes each webject, a specific function associated with the webject is executed against one or more information sources 309. A result of the function is then displayed to the end user through a Web browser running on one of the clients 302. In contrast, rather than displaying the results of the function to the end user, the non-interactive display modules 314 use the results of one function to initiate one or more additional functions. For example, when information must be transferred from one system to another it may not require any interaction by a user.

Another example is when information is to be manipulated prior to displaying it to the user, or when it is used to access information from a second source. The non-interactive display modules 314 pass the results of the function from one webject to another webject in the same template, or possibly another template that is called by a webject. This functionality is referred to herein as "chaining" of parameters, webjects or templates.

Object request 316 is the function of the server that analyzes the components of a webject, then determine which adapter(s) should be sent a request, and what components make up that request such as (request type, class of object involved, attributes of object involved, whether to expect information returned, etc). Object modeling 318 is the ability to manipulate (sort, join, intersect, or modify in other ways) groups of information returned from one or more webject requests. The server 304 utilizes a neutral Object Request Broker (ORB) to provide object support. The ORB utilized by the present invention can co-exist with any tool providing support for objects delivered across a network such as the Common Object Request Broker Architecture (CORBA) 322 component and the Distributed Component Object Model (DCOM) 324 component.

Figure 5:
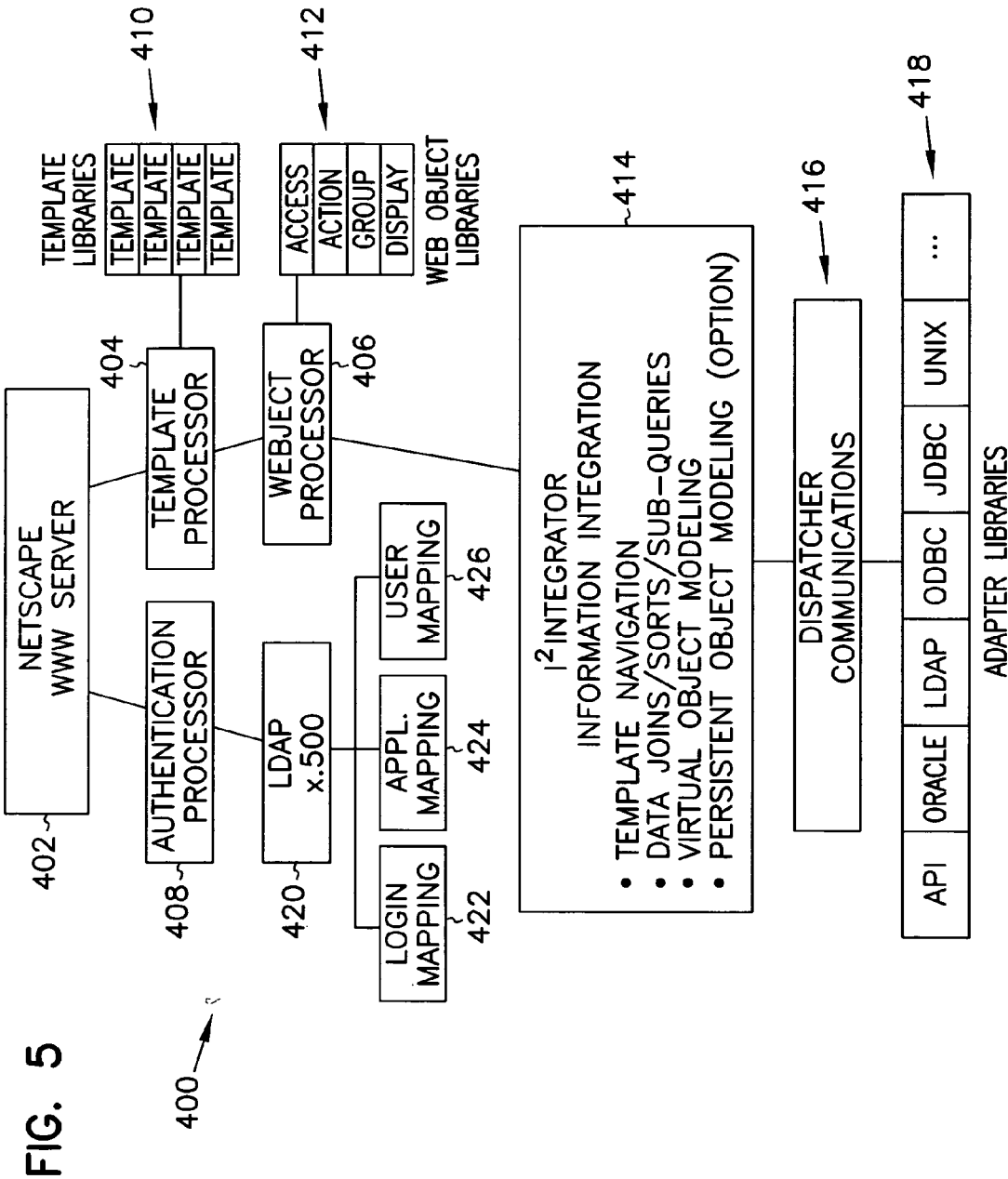
FIG. 5 is a block diagram of a server as shown in the intranet architecture of FIG. 1 capable of processing webjects.

Data Flow. FIG. 5 is a block diagram of one embodiment of a server 400 capable of processing webjects. It illustrates how the data flows through the server as it is processed. The server includes a web server process 402 for responding to requests for data from a web client. The server 400 further comprises a template processor 404, a webject processor 406 and an authentication processor 408.

The template processor 404 processes templates having a plurality of HTML tags and a plurality of webjects. A plurality of templates are stored in a template library 410. When the server 400 encounters a webject tag in the template, a specific function is executed depending on the type of webject tag.

The web-object processor 406 processes the webjects. The present invention utilizes four types of webjects: query, display, action and group. The actions that are executed for each type of webject are defined in a webject library 412.

Query webjects search a database for objects that match specified criteria defined by parameters with the webject. The results of a query are stored by the server 400 in the server's memory (VDB) in a common format as groups of objects (which can be though of as tables of information) recognizable by other webjects.

Display webjects generate the HTML tags and text that a browser uses to display information to the user based on information received from the query webjects. When display webjects tags process an object or multiple objects from a query webject tag, the display webjects use a variety of presentation formats to change the appearance of the objects. The original webject tag in the template is dynamically replaced with HTML tags and text so that the browser can display in information to the user.

Action webjects perform specified actions, such as creating, copying and updating information in data sources. Templates that include action webjects are of a special class called action templates. When the server encounters an action template, the server performs the specified actions and then continues its processing based on any success or failure criteria that have been specified. Action templates are used to perform one or more actions and possibly branch to other templates depending on the results of the action webjects.

Group webjects compare, combine, change, extract or sort groups of data received from query webjects. Once information has been manipulated by a group webject, the server translates it into an object recognizable by other webjects and saves it in the VDB. Group webjects manipulate data stored dynamically in the memory of the server by query webjects or other group webjects.

Information integration 414 provides the ability to combine information from one or more sources to form more intelligent or knowledge-based information for the user. This component assembles the requests that are sent to the adapters and processes the information received from them.

Communication dispatcher 416 is the component which "dispatches" the requests to the adapter. It determines from the application profiles what computer systems the adapters are running on, what ports the adapters are listening on, and the user access method. This dispatcher automatically determines which system or adapter to access depending upon the webject parameters.

An Adapter library 418 provides a plurality of adapters for accessing and manipulating one or more information sources within an enterprise.

A LDAP component 420 allows a user to author templates for access to distributed environments through X.500 directories or any other LDAP compliant application. The LDAP component 420 provides webjects having capabilities for determining if data with specific attributes exists within directories, creating and deleting objects within directories, updating or querying for objects and their attributes within directories, updating the relative distinguished name of directory entries, determining if objects exist within an X.500 sub-tree, and validating the existence of particular users within X.500 directories.

All of the adapters have authentication, application mapping and login mapping capabilities that provide the federated administration component of the invention. An authentication processor 402 verifies that a user has access to an adapter resource and allows for integration with LDAP directories. An application mapping component 424 allows symbolic application names to be associated with various parameter values (e.g. the server host name, the communication port, and the default user), thus simplifying repetitive tasks and webject authoring. A login mapping component 422 allows users access to multiple adapters with a single user name and password while automatically determining the login method and user names to user for each user to preserve application rules.

Info*Engine Implementation. This section describes a particular implementation of the application mapping, authentication, and login mapping capabilities that are part of the Info*Engine product available from Auxilium, Inc.

Application Mapping. Info*Engine allows the solution author to develop highly scalable solutions in many ways. One such way is through the use of application mapping. In the simplest definition, application mapping is the ability to store the dbhost and dbport information for a given adapter in a central place to simplify webject authoring tasks.

A traditional webject tag (type OBJ or ACT) would employ the use of the following parameters:

| | |
|---|---|
| <param key=dbhost | value=localhost> |
| <param key =dbport | value=someport> |

Should the adapter be moved or configured to listen on a different port, however, the effort to reflect this change could be quite high depending upon the number of webjects within the template files for all solutions that require access to this adapter.

If, however, the host and port information for an adapter could be stored in a central repository (such as a table within a database) and identified within the webject tags by some logical name (such as "oracle" or "empdata"), this could significantly improve the scalability of the solution being deployed. An example of this could work as follows:

A (database-driven) group of objects containing the following information exists:

| Application Name (application) | Host Name/IP address (dbhost) | Port Name/Number (dbport) |
|---|---|---|
| empdata | batman | 8339 |
| proddata | 132.185.39.9 | pdmlink |

Webject tags within many template files exist that utilize the following syntax:

| | |
|---|---|
| <webject name=query-objects | type=obj> |
| <param key=application | value=empdata> |
| <param key=class | value=people> |
| <param key=where | value=( )> |
| <param key=group_out | value=querygroup> |
| </webject> | |

In this example, Info*Engine would resolve the logical name "empdata" to equate to the normally required query parameters for dbhost and dbport. Specifically in this case those parameters would equate to:

| | |
|---|---|
| <param key=dbhost | value=batman> |
| <param key=dbport | value=8339> |

Should the need arise requiring that the adapter listening on port "8339" on the "batman" host change in some way (such as listening on a new port), only the information within the database table containing the logical mapping would have to be changed. The change would be reflected in every webject within every template where it is used throughout the solution automatically.

| Application Name (application) | Host Name/IP address (dbhost) | Port Name/Number (dbport) |
|---|---|---|
| empdata | batman | 9779 |
| proddata | 132.185.39.9 | pdmlink |

Other information may also be stored within such a mapping table or directory entry to facilitate scalable solution development.

Typically, if a "default_user" is defined within the configuration file(s) for an adapter, it is this user that will be used to perform operations against the native application unless specified otherwise.

One of the additional items that can be used within an application mapping directory is that of the "default_user." In this case, if Info*Engine finds a value for "default_user" when a logical application name is specified within a webject tag, the value for the default_user as specified in the directory for the application would supersede the value specified in the adapter configuration file.

| application | default_user | default_passwd | dbhost | dbport |
|---|---|---|---|---|
| empdata | scott | tiger | batman | 9779 |
| proddata | super user | supasswd | 132.185.39.9 | pdmlink |

This feature allows the solution author to tactically determine which actions within a solution should use "guest" privileges and which should utilize "admin" privileges for example. What would be required to fulfill this need would be to define more than one logical application name for the same adapter host and port, but with different default_user and default_passwd definitions.

| application | default_user | default_passwd | dbhost | dbport |
|---|---|---|---|---|
| empguest | guest | guest | batman | 9779 |
| empadmin | system | syspasswd | batman | 9779 |
| empdata | scott | tiger | batman | 9779 |
| proddata | super user | supasswd | 132.185.39.9 | pdmlink |

In this case, a single template could have two webject tags which appear to perform the same query, with the only difference being the application name. The results, however, could be radically different for each based upon which "default_user" was used.

The utilization of the "dbuser" parameter <param key=dbuser value="system/syspasswd"> on a webject tag will supersede both the application map and the adapter configuration file(s). However, should the username/password combination change, all webject tags throughout the solution which employ the use of the dbuser parameter would require change. This is opposed to leveraging the application map which would require change in only one location.

Other information about each application can also be leveraged within a application mapping directory which will be identified in a later section.

The set-up/configuration of application mapping is done through the use of a database or directory which contains the mapping information and an Info*Engine template which is processed by the Info*Engine server during start-up (or optionally during the processing of each solution template which will be addressed in a later section).

The database or directory can be configured in any way as long as the information can be obtained through an Info*Engine/adapter query. An example of a SQL-based database definition for application mapping might be:
Table Name: appmap
Columns: application, dbhost, dbport, default_user, default_passwd The application, dbhost and dbport columns require information, however, it is not required to have a default-user and default_passwd (these will utilize the setting in the webject tag as the highest preference, the application map as the next preference, and the adapter configuration file as the last preference; if none exists, the action will fail by design).

Example data might appear as follows:

| application | default_user | default_passwd | dbhost | dbport |
|---|---|---|---|---|
| empguest | guest | guest | batman | 9779 |
| empadmin | system | syspasswd | batman | 9779 |
| empdata | scott | tiger | batman | 9779 |
| proddata | super user | supasswd | 132.185.39.9 | pdmlink |

Once the directory or database is defined, a template must be generated which creates a group in the VDB called "ie_appmap". This ie_appmap group should contain "application", "dbhost", "dbport", "default_user" and "default_passwd" attributes.

An example template might contain the following webject tag:

```
<webject name=query-objects      type=obj>
    <param key=dbhost            value=somehost>
    <param key=dbport            value=someport>
    <param key=class             value=appmap>
    <param key=attributes
      value=application,dbhost,dbport,default_user,default_passwd
    delim=,>
    <param key=group_out         value=ie_appmap>
</webject>
```

This template can be created and saved on a file system accessible to the Info*Engine server. An example location might be "/usr/ns-home/ie/config/appmapfile" where appmapfile is the name of the file.

In this case, the database columns utilize the names "application", "dbport", "dbhost", etc. Therefore, the VDB will be created using the correct attribute names by default. If the directory or database does not use these attribute names, the query webject should use a group_out of something other than "ie_appmap", then the template should employ the use of the "change-group" webject to rename the attributes appropriately with the final resulting group_out being "ie_appmap".

Next, the Info*Engine server must be configured to read this information into the VDB. There is a special "persistent" VDB designed specifically for the application mapping information. This VDB is created during the server start-up, and exists for the life of the web server. This is designed to provide a maximum template processing performance. However, if the information in the application mapping directory is changed, the web server must be recycled (stopped and started) to affect the changes if this VDB is used.

To configure the Info*Engine server to use application mapping, find the Initialization lines for Info*Engine in either the magnus.conf or the obj.conf file (depending upon your installation). Locate the line which initializes Info*Engine: e.g.: Init fn=IE_init shlib="/sur/ns-home/ie/binfie.so" . . . .

Append the following to this initialization line: template="/path/to/appmap/template"

Be sure to use the fully qualified path to the application mapping template. An example might appear as follows:
Init fn=IE_init shlib="/usens-home/ie/bin/ie.so" template="/usr/ns-home/ie/config/appmapfile" taflog=" . . . rest of the initialization line . . . .

Once this change has been made to the configuration file, the web server can be recycled. Upon startup of the webserver, webjects within templates should be able to utilize application parameters in place of explicit dbhost and dbport definitions.

For debugging purposes, it is possible to place a display webject within the application mapping configuration template. The output of this display webject will be directed to the window in which the web server was started.

```
<webject name=query-objects      type=obj>
    <param key=dbhost            value=somehost>
```

```
    <param key=dbport            value=someport>
    <param key=class             value=appmap>
    <param key=attributes
        value=application,dbhost,dbport,default_user,default_passwd
    delim=,>
    <param key=group_out         value=ie_appmap>
</webject>
<webject name=object-list        type=dsp>
    <param key=group_in          value=ie_appmap>
    <param key=attributes
        value=application,dbhost,dbport,default_user,default_passwd
    delim=,>
</webject>
```

If an object-list display webject were to be inserted into the appmap template as in the above example, the output of the object-list would be displayed to the user along with the other startup messages in the unix window used to start the web server.

Finally, Info*Engine will attempt to find application mapping information whenever an "application" parameter is used within a webject. Since it is not required to store the application mapping data within the persistent VDB, Info*Engine will first look in the persistent application mapping VDB for the information. If it is not found in this VDB, Info*Engine will look next in the authentication VDB (to be discussed in another section), then in the template processing VDB (which is the standard VDB used during normal solution authoring and populated through the use of webject tags within the solution templates). If no mapping data is found, an error will be generated to STDOUT.

Login Mapping. Another way that Info*Engine allows a solution manager to develop highly scalable solutions is through the use of login mapping. Within the enterprise computing environment, it is rare to find that a user's login information (usernames and passwords) are the same across all applications. This can present the solution author with a significant challenge when developing solutions that require robust information access, while maintaining the business rules for each user for each system. By robust information access, we are referring to workflow-based access to diverse systems within a single screen, for example. Instead, many IT solutions are developed that either focus on a single application (where "authorized" "user_types" are useful), or that offer access to each system required using "guest" login for everyone that uses the solution through the web interface for instance.

To support robust solution development, Info*Engine allows the solution author to enhance the delivery to the end-user by offering the ability to map the username and password entered within the authentication dialog of the web browser to the appropriate usernames and passwords for this user for all applications accessed through webject tags within the solution templates. This concept is called "login-mapping" or "web-single-logon".

Consider the following:

A (database or application-driven) group of objects containing the following information exists:

| authname | authpass | application | app_user | app_passwd |
|----------|----------|-------------|----------|------------|
| jjd1     | cft8o    | empdata     | joe      | frt4u      |
| jjd1     | cft8o    | proddata    | jjd1     | jjd123     |
| jjd1     | cft8o    | pdmsystem   | user1    | twister    |
| jjd1     | cft8o    | sybasedata  | system   | syspasswd  |

Webject tags within the solution template files exist that utilize the "application" parameter: e.g.:

```
<webject name=query-objects      type=obj>
    <param key=application       value=empdata>
    <param key=class             value=people>
    <param key=where             value=( )>
    <param key=group_out         value=querygroup>
</webject>
<webject name=query-objects      type=obj>
    <param key=application       value=proddata>
    <param key=class             value=parts>
    <param key=where             value=( )>
    <param key=group_out         value=partgroup>
</webject>
```

Solution template files exist in a protected realm. The user, identified by a "corporate" or "enterprise" username requests one of the templates through the use of a URL. The web browser will prompt the user for a username and password with an authentication dialog. The user enters a username of "jjd1" and a password of "cft8o" into the dialog.

In this example, Info*Engine would utilize the username "jjd1" and password "cft8o" (entered by the user when authenticating) for login mapping purposes. When a webject tag is encountered using an "application" of "empdata" for example, Info*Engine would send a request to the appropriate adapter, along with an application username of "joe" and a password of "frt4u" to be used when connecting to the application. Info*Engine would have resolved this application specific username/password combination from the login-mapping group. When a webject tag is encountered using the "application" of "proddata", Info*Engine would send a request to the appropriate adapter, along with an application username of "jjd1" and an application password of "jjd123" to be used when connecting to the application. Again, Info*Engine would have obtained the application specific login information from the login-mapping group based upon the "enterprise" login the user presented when authenticating.

As with "Application Mapping" and "Authentication", Info*Engine Login-Mapping is configured through the use of a login-mapping template.

Info*Engine utilizes a group called "ie_usermap" which it finds in the Authentication VDB for resolving application specific logins and passwords for each enterprise user. Since the enterprise user information is required for this resolution to take place, Info*Engine style authentication must be used in any realms where login-mapping is desired.

When a template is requested from within the protected realm using Info*Engine style authentication, the user is prompted for their enterprise user information. At this time, the authentication template is processed to evaluate whether the user has privileges to access the requested realm as described in the Info*Engine Authentication section. However, if login-mapping is to be used, this template should also employ a webject tag which generates a group containing this user's login-mapping information. An example database schema containing login mapping information might appear as follows:

Table: usermap
Columns: authname, authpass, application, app_user, app_passwd

Example table data that might exist within this database:

| authname | authpass | application | app_user | app_passwd |
|----------|----------|-------------|----------|------------|
| jjd1     | cft8o    | empdata     | joe      | frt4u      |
| rma      | uty67    | empdata     | robert   | kitys      |

-continued

| authname | authpass | application | app_user | app_passwd |
|---|---|---|---|---|
| jjd1 | cft8o | proddata | jjd1 | jjd123 |
| rma | uty67 | empdata | rma | rma123 |
| jjd1 | cft8o | pdmsystem | user1 | twister |
| rma | uty67 | empdata | user5 | spkzz |
| jjd1 | cft8o | sybasedata | system | syspasswd |
| rma | uty67 | empdata | scott | tiger |

An example webject tag that might be used within the authentication template to generate the login-mapping group:

```
<webject name = query-objects        type=obj>
    <param key=application           value=ora123>
    <param key=class                 value=usermap>
    <param key=attributes
        value=application,app_user,app_passwd
    delim=,>
    <param key=where
        value="'authname'=ie_dbuser&'authpass'=ie_dbpasswd">
    <param key=group_out             value=ie_usermap>
</webject>
```

The group that this tag generates would have to be generated within the authentication template in addition to the "ie_auth" group used for authentication. The "where" clause used in this webject tag is utilizing two CGI-like variables "ie_dbuser" and "ie_dbpasswd". These are generated by Info*Engine for use within the authentication template. These variables contain the values entered by the user in the authentication dialog. In this example, the "where" clause is searching the database for records which contain the name and password combination. If this combination exists, the value(s) for "application", "app_user" and "app_passwd" returned by the query are placed in the "ie_usermap" group within the authentication VDB.

The authentication VDB with the "ie_auth" and "ie_usermap" groups is generated prior to processing each template.

When this webject tag is processed using an "ie_dbuser" of "jjd1" and an "ie_dbpasswd" of "cft8o", the following group would exist in the authentication VDB:

| application | app_user | app_passwd |
|---|---|---|
| empdata | joe | frt4u |
| proddata | jjd1 | jjd123 |
| pdmsystem | user1 | twister |
| sybasedata | system | syspasswd |

This group would then be used to resolve login-mapping information based upon logical application names as defined within webject tags. Application mapping must be used in conjunction with Info*Engine authentication for login mapping to be used.

It is possible to utilize a single query for authentication and the generation of the login-mapping group within the authentication template for performance reasons. This can be accomplished through the use of an authentication template similar to the following:

```
<webject name=query-objects          type=obj>
    <param key=application           value=ora123
```

```
    <param key=class                 value=usermap>
    <param key=attributes
        value=authname,authpass,application,app_use,app_passwd
    delim=,>
    <param key=where
        value="'authname'=ie_dbuser&'authpass'=ie_dbpasswd">
    <param key=group_out             value=ie_auth>
</webject>
<webject name=copy-group             type=grp>
    <param key=group_in              value=ie_auth>
    <param key=group_out             value=ie_usrmap>
</webject>
```

This example template first queries the "usermap" table in the database attempting to find any records that have an "authname/authpass" combination that matches the values entered into the browser authentication dialog (ie_dbuser/ie_dbpasswd). If any records exist, the values for "authname", "authpass", "application", "app_user" and "app_passwd" are placed into the group "ie_auth". Info*Engine will consider this user to be authenticated if one or more objects are contained in the "ie_auth" group (refer to the Info*Engine Authentication section for more detail).

Next, the contents of the "ie_auth" group are copied into a group called "ie_usrmap" for use in login mapping using a "copy-group" webject. Both of these groups would contain objects as reflected in the following table:

| authname | authpass | application | app_user | app_passwd |
|---|---|---|---|---|
| jjd1 | cft8o | empdata | joe | frt4u |
| jjd1 | cft8o | proddata | jjd1 | jjd123 |
| jjd1 | cft8o | pdmsystem | user1 | twister |
| jjd1 | cft8o | sybasedata | system | syspasswd |

If a webject tag similar to the following example were located in a template within this authenticated realm:

```
<webject name=query-objects          type=obj>
    <param key=application           value=pdmsystem>
    <param key=class                 value=parts>
    <param key=where                 value=( )>
    <param key=group_out             value=partgroup>
</webject>
```

Info*Engine would have used the "ie_usrmap" group to find the appropriate application username and password for "jjd1/cft8o" for the "pdmsystem" application. The application username "user1" and application password "twister" would be used to access this system in this case.

Note: To provide a more understandable example, we have depicted the use of a database to store the login-mapping information. Although the use of a simple table as in the example above may provide an easier system for initial setup or understanding, it may be more difficult to maintain when many applications exist for each user. The use of a hierarchical or object-oriented system for storage of the login-mapping information may provide greater administrative flexibility, therefore a more scalable system.

The following list details how to configure login mapping:
1. The setup/configuration of login mapping is done through the use of a database or directory which contains the mapping information and an Info*Engine template which is processed by the Info*Engine server prior to processing each template located in the appropriately protected realm (see the Info*Engine Authentication section for more information on setting up a protected realm).

The data base or directory can be configured in any way as long as the information can be obtained through an Info*Engine/adapter query. An example of a SQL-based database definition for application mapping might be:

Table Name: usermap

Columns: authname, authpass, application, app_user, app_passwd

The application, app_user and app_passwd columns require information for each user's entry if access to the system is desired. If any of these fields do not contain the appropriate information, login-mapped access may not function as desired.

Example data might appear as follows:

| authname | authpass | application | app_user | app_passwd |
|----------|----------|-------------|----------|------------|
| jjd1 | cft8o | empdata | joe | frt4u |
| rma | uty67 | empdata | robert | kitys |
| jjd1 | cft8o | proddata | jjd1 | jjd123 |
| rma | uty67 | empdata | rma | rma123 |

2. Once the directory or database is defined, the Authentication template must be modified to create a group in the Authentication VDB called "ie_usermap" in addition to the "ie_auth" group.

An example template might contain the following webject tags:

```
<webject name=query-object           type=obj>
   <param key=application             value=ora123>
   <param key=class                   value=usrmap>
   <param key=attributes
      value=authname,authpass,application,app_user,app_passwd
      delim=,>
   <param key=where
      value="'authname'=ie_dbuser&'authpass"=ie_dbpasswd">
   <param key=group_out               value=ie_auth>
</webject>
<webject name=copy-group             type=grp>
   <param key=group_in                value=ie_auth>
   <param key=group_out               value=ie_usrmap>
</webject>
```

This template can be saved in the same file system location accessible to the Info*Engine server as the existing authentication template. An example location might be "usens-home/ie/config/authfile" where authfile is the name of the file.

In this case, the database columns utilize the names "application", "auth_user" and "auth_passwd". Therefore, the VDB will be created using the correct attribute names by default. If the directory or database does not use these attribute names, the query webject should use a group_out of something other than "ie_usermap", then the template should employ the use of the "change-group" webject to rename the attributes appropriately with the final resulting group_out being "ie_usermap".

3. Next, the "user_type" of any application definition within the Application

Map or Webject Tag that is intended to have login id's mapped should be set to "generated" (see the Info*Engine Application-mapping and Authentication sections for more information).

```
<webject name=query-objects          type=obj>
   <param key=application             value=empdata>
   <param key=user_type               value=generated>
   <param key=class                   value=people>
   <param key=attributes
      value-fname,lname,phone,dept
      delim=,>
   <param key=where                   value="( )">
   <param key-group_out               value=ie_auth>
</webject>
```

4. The web server should now be recycled (stopped and re-started).

Login mapping should now function according to the specifications as defined above.

5. For debugging purposes, it is possible to place one or more display webjects within the authentication template. The output of these display webjects will be directed to the window in which the web server was started.

e.g.:

```
<webject name=query-objects          type=obj>
   <param key=application             value=ora777>
   <param key=class                   value=people>
   <param key=attributes
      value=corpid
      delim=,>
   <param key=where
   value="'corpid'=ie=dbuser&'corppass'=ie_passwd">
   <param key= group_out              value-ie_auth>
</webject>
<webject name=object-list            type=dsp>
   <param key=group_in                value=ie_auth>
   <param key=attributes              value=corpid
      delim=,>
</webject>
```

If an object-list display webject were to be inserted into the authentication template as in the above example, the output of the object list would be displayed to the user during the processing of each template located within the "Info*Engine" protected realm. This output would be displayed in the unix window used to start the web server.

6. Finally, it is not required to store the authentication group in the authentication VDB. If performance is an issue, this group may be created and stored along with the application mapping group in the persistent VDB (or optionally within the general VDB). Info*Engine will attempt to find the authentication group first in the persistent application mapping VDB. If it is not found in this VDB (which is the standard VDB used during normal solution authoring and populated through the use of webject tags within the solution templates). If no authentication data is found, a non-authenticated error will be generated.

Definitions In addition, the computerized system for this invention includes: Workbench Applications, Business Process Templates, Business Transaction Library Webjects, Application Profiles, Application Mapping, Application Multiplexing, Business Object Directories, Schema Maps, User Profiles, Login Maps, Adapters, the Info*Engine server, the Virtual Data Base, and Group Operations. These features are defined below.

Workbench Applications: a computerized collection of role-based capabilities, combined to facilitate execution of a business process.

Business Transaction Library Webjects: an abstracted computer-based business function which can be stored as an HTML-like tag or signature within an HTML template file, or as a JavaBean which when received by an Info*Engine server, is sent to an appropriate adapter which subsequent business transaction processing occurs. Such processing can be varied greatly by making extremely simple changes to the Webject properties.

Application Profiles: Information such as logical application names, methods of accessing the applications, classes of objects managed by the applications, hosts (machines) on which the applications exist and application-specific access information such as "connection strings" are stored within the application Profiles.

Application Mapping: The ability to automatically resolve which application or applications will be interacted with by Info*Engine by merely identifying a logical application name (such as EmployeeData) as one of the properties of an action Webject. This is made possible through the user of a hierarchical Profile of applications that make up the overall solution.

Application Multiplexing: The ability to broadcast a request to more than one application simultaneously, then to combine the results prior to adding a resultant group of objects to the VDB.

Business Objects Directory: The ability of Info*Engine to retrieve a hierarchical definition of the corporate data model form an adapter accessible source such as an x.500 directory.

Schema Mapping: The ability to allow solutions to be built using corporate standard data model class and attribute names rather than requiring the use of application specific names. The corporate standard data model class and attribute names used will then be automatically converted to the appropriate names for the specific application being accessed.

User Profiles: Information such as a user's corporate name and corporate password are stored within a hierarchical user profile. Other information is also stored with each user entry. Such information includes application-specific login methods for each user including login names and passwords, roles, and scopes of access (what depth of access, or which applications the user wishes to include when interacting with a system).

Login Mapping: The ability to map the username and password entered during authentication to the appropriate usernames and passwords for this user for all applications accessed by Info*Engine. This also includes the ability to apply the scope each user has defined for accessing each class of information within a solution or application.

VDB/EIB/Object Modeler: A location/mechanism designed for storing groups of objects, their associated attributes and other meta-data abut the objects and the groups themselves. It is within this VDB that objects are post-processed/combined/synthesized by Info*Engine to provide the capability to present "digested" information to end users within Info*Engine solutions.

Group Operations: Operations which are performed on VDB groups such as sorting, joining, merging, filtering, etc. of information (such groups of information may have come from many disparate data storage applications). These operations are controlled through simple utilization of Webjects.

Conclusion. The invention offers inherent flexibility in accessing data from multiple information systems. Adapters are used to provide two-way access to information systems through various methods such as application interfaces, direct database access, application user interfaces to legacy systems and other non-intrusive means. The action of the adapters is controlled by webjects that contain parameters that define what functions the adapters perform.

Webjects provide a common mechanism for access data from multiple information systems. The format of the webjects is the same no matter what the information system is. Therefore, they are easy to use in intranet embodiments of the invention which use HTML pages to define Web-based applications.

An advantage of webjects is that webjects are more powerful, flexible, scalable and easy to use than CGI programs. Developers may only use CGI programs to display Web pages that offer the specific form and function for which the CGI program was written. Developers that use webject tags to build pages may simply add the tags to existing HTML files. Developers have the flexibility to develop pages that utilize standard corporate formats. Each time the functionality or format of display must change, developers need only modify a simple HTML file.

Conversely, utilization of a CGI program to develop the same solution would require access to the programming environment and compilers, experience with the programming language and experience interfacing with the legacy system's Application Programming Interface (API). Modification of the solution, such as the addition of an attribute within the query and resulting page would require that the CGI program be modified and recompiled. Scaling such a paradigm across the enterprise is difficult, if not impossible.

Webjects can be assembled in HTML files to provide important functionality such as the implementation of business rules and workflow procedures. These functions are implemented using the webjects to access, manipulate, display information and perform actions such as update and create data in information systems. Certain control capabilities are available with action webjects.

The invention also incorporates functions that deal with administrative issues of a system that must be scaled to an extended enterprise.

Other mechanisms for providing enterprise-wide application interoperability will be apparent to those skilled in the art, as will the use of alternate methods for providing such interoperability. It is to be understood that the above description is intended to be illustrative, and not restrictive. Many other embodiments will be apparent to those of skill in the art upon reviewing the above description.

What is claimed is:

1. A computerized system for accessing information from multiple data sources, the computerized system comprising:
   one or more webjects in a HyperText Markup Language (HTML) template, each webject including:
      a plurality of attributes, each attribute including a name-value pair, the plurality of attributes including a webject type attribute; and
      a plurality of parameter tags, each parameter tag including a plurality of parameter attributes, each parameter attribute including a name-value pair;
   a server, the server having one or more template libraries and configured to process the one or more webjects into one or more requests in a common format;
   two or more adapters, each one of the adapters configured to:
      convert a request in the common format to a format appropriate for a data source; and
      cause a function to occur within the data source based on the converted request;
      wherein the two or more adapters allow the server to access multiple data sources; and wherein at least one of the adapters provides an interface to a legacy application thereby allowing the server to access information on the legacy application.

2. The computerized system of claim 1, further comprising one or more clients, each one of the clients having a user interface for presenting the information from the legacy application to the user such that the information from the legacy application is interchangeable with information from a non-legacy application.

3. The computerized system of claim 1, wherein each one of the adapters provide authentication for verifying that a user has access to a data source.

4. The computerized system of claim 1, wherein each one of the adapters provide application mapping for allowing a symbolic application name to be associated with one or more parameter values.

5. The computerized system of claim 1, wherein each one of the adapters provide login mapping for allowing the user to access the adapters with a single user name and password.

6. The computerized system of claim 1, wherein the server includes a virtual database (VDB) in the server's memory, the VDB configured to store data retrieved from an adapter in a common format as groups of objects.

7. The computerized system of claim 6, wherein one of the plurality of parameters in the webject includes a group parameter of at least a group_out parameter or a group_in parameter, wherein the plurality of parameters in the webject parameters are stored in the VDB and associated with a first name specified by the group_in parameter if the group_in parameter is set and a set of parameters associated with a second name specified by the group_out parameter is associated with the webject if the group_out parameter is set.

* * * * *